3,240,763
COPOLYMERS OF MALEIC ANHYDRIDE
Huey Pledger, Jr., Jackson, Tex., assignor to The Dow Chemical Company, Midland, Mich., a corporation of Delaware
No Drawing. Filed July 14, 1961, Ser. No. 124,026
3 Claims. (Cl. 260—78.5)

This invention relates to new thermoplastic compositions of matter and to a method for their preparation. More particularly, it relates to novel copolymers of maleic anhydride and bicyclo[2.2.1]hepta-2,5-diene.

Copolymers of maleic anhydride with various vinyl monomers such as styrene and acrylonitrile and with cycloolefins such as conjugated and unconjugated terpenes are well known. These copolymers are useful in themselves as resins and as components of resinous compositions. They are also particularly useful because of the the acid anhydride rings present in their structure which may be opened to form polyesters and like derivatives having a wide range of properties.

It has now been found that maleic anhydride and bicyclo[2.2.1]hepta-2,5-diene will copolymerize to form thermoplastic solids when the two monomers are heated together in the presence of a free radical initiating catalyst. The copolymers obtained are solids of varying melting points depending upon the degree of polymerization. They may be cast into useful shapes by heating under compression to make hard, transparent castings which are somewhat brittle. These copolymers are soluble in a number of solvents and transparent, brittle films can be formed from these solutions. The properties of these films and castings may be varied by incorporation of conventional plasticizers, fillers, or other thermoplastic materials. As with other copolymers of maleic anhydride, the acid anhydride rings in the polymer structure may be opened to form polyesters and other derivatives useful alone or as components of resinous compositions.

Catalysts effective in initiating the copolymerization process are any of known free radical initiators. These include peroxygen compounds such as benzoyl peroxide, di-tert-butyl peroxide and potassium persulfate, azo catalysts such as azobisisobutyronitrile, and radiation, for example, actinic radiation such as ultraviolet light and X-rays, or high energy radiations such as accelerated electrons and gamma radiation as well as radiation from a radioactive source. The rate of copolymerization is increased by using larger amounts of such catalysts, at least to a point, but larger amounts of catalyst may at the same time have adverse effects on the quality of the copolymer formed. Optimum amounts of catalyst vary according to the conditions under which the copolymerization is carried out.

Convenient polymerization catalysts are azo and peroxygen catalysts which may be used effectively in proportions of 0.001–0.1 mole per mole of total monomers.

Preferably, the copolymerization is carried out in solution in an organic solvent which is unreactive under the conditions used. Suitable solvents include hydrocarbons such as benzene, toluene, ethylbenzene, xylene, and decane, oxygenated solvents such as methylethyl ketone and tetrahydrofuran, halogenated solvents, and others not having active hydrogen atoms in their structures. Concentrations of one gram mole of total monomers to about 200–2000 cc. of solvent have been found satisfactory. Increased dilution tends to slow the copolymerization rate and produces copolymers of lower molecular weight. The maleic anhydride content of the copolymer produced has also been found to increase with an increased proportion of solvent.

A suitable temperature range for the copolymerization is about 70–150° C. A range of about 90–115° C. is preferred.

The molar ratio of the two monomers has a direct effect on the composition of the copolymer produced. For example, increasing the ratio of maleic anhydride from 0.2 to 2.0 moles per mole of bicycloheptadiene increased the proportion of maleic anhydride in the copolymer formed from 0.66 to about 0.80 mole per mole of the other monomer.

The copolymerization may be carried out under subatmospheric or superatmospheric pressure. Ordinarily it is most convenient to operate the reaction at or near normal atmospheric pressure.

Various methods of operating the copolymerization process are illustrated by the examples which follow.

*Example 1*

A flask equipped with a condenser, a stirrer, a thermometer, and a gas inlet tube was charged with a solution of 0.2 g. mole of maleic anhydride in 100 cc. of xylene. A slow stream of nitrogen was started through the gas inlet tube and 1.0 g. mole of bicyclo[2.2.1]hepta-2,5-diene and 0.002 g. mole of benzoyl peroxide were added to the solution. The solution was stirred and heated rapidly to 90° C. on a water bath. The reaction mixture was stirred at 90–92° C. for 3 hours while maintaining the flow of nitrogen. At the end of this time, the polymerization was stopped by the addition of about 5 cc. of a 10% solution of N-phenyl-2-naphthylamine. The heterogeneous reaction mixture was cooled to room temperature and the solid polymer was separated by suction filtration under nitrogen. The polymer was washed with xylene and dried to constant weight in a vacuum oven at 90° C. There was obtained 7.2 g. of a white powder with a beginning melting point of 323° C. in a sealed tube. The product was soluble in acetone, pyridine, tetrahydrofuran, and aqueous ammonia. A hard, transparent, and somewhat brittle molding was made by heating the copolymer under compression. A sample of the product was hydrolyzed to the acid form for analytical purposes as follows:

A 1.99 g. sample of the product was heated 3 hours at 100° C. in a solution of 75 cc. of pyridine and 10 cc. of water. The resulting homogeneous solution was poured into 150 cc. of water and crushed ice and this mixture was acidified to about pH 2 with concentrated hydrochloric acid. The fine precipitate was coagulated on the steam bath, separated by filtration, washed with water, and dried to a constant weight of 2.3 g. in a vacuum oven at 30° C. The polyacid obtained melted at 319–344° C. Potentiometric titration with 0.1 N NaOH in 50% aqueous acetone solution indicated that the polyacid was made up of repeating units with a molecular weight of 255.2. Assuming one maleic anhydride molecule per repeating unit, the ratio of maleic anhydride to bicyclo[2.2.1]hepta-2,5-diene is thereby found to be 1.0 to 1.51. Analysis by infrared absorption supported this structure.

*Example 2*

In the manner described in Example 1, a solution of 0.5 g. mole of maleic anhydride, 1.0 g. mole of bicyclo[2.2.1]hepta-2,5-diene, and 0.002 g. mole of benzoyl peroxide in 1000 cc. of xylene was stirred 3 hours at 90–92° C., thereby causing separation of a solid copolymer. The solid copolymer was filtered and dried as shown in Example 1. It was a white powder amounting to 15.8 g. and having a beginning melting point of 309° C. Titration of a hydrolyzed sample showed that the copolymer was made up of repeating units containing one molecule of maleic anhydride to 1.46 molecule of bicyclo[2.2.1]hepta-2,5-diene.

Example 3

According to the general procedure of Examples 1-2, 2.0 g. moles of maleic anhydride, 1.0 g. mole of bicyclo[2.2.1]hepta-2,5-diene, and 0.002 g. mole of benzoyl peroxide were dissolved in 1000 cc. of xylene and the solution was heated under nitrogen for 4.5 hours at 101–115° C. A total of 73.7 g. of white, solid copolymer was obtained, the product having a beginning melting point of 354° C. Its other physical properties were similar to those of the product of previous examples. Its structure, as shown by titration of a hydrolyzed sample, consisting of repeating units containing 1.24 molecules of bicyclo[2.2.1]hepta-2,5-diene per molecule of maleic anhydride.

Heating the above reaction mixture for 3 hours at 90–92° C. produced 44.4 g. of copolymer of similar properties.

When the amount of benzoyl peroxide in the above reaction mixture was doubled and the mixture was then heated for 3 hours at 90–92° C., 102.2 g. of polymer was obtained and this product had a beginning melting point of 209° C.

Example 4

As previously described, 2.0 g. mole of maleic anhydride, 1.0 g. mole of bicyclo[2.2.1]hepta-2,5-diene, and 0.004 g. mole of benzoyl peroxide were dissolved in 6320 cc. of xylene and the solution was stirred 3 hours at 90–92° C. under nitrogen. During this period, a white solid copolymer separated from the solution. The copolymer product was filtered from the reaction mixture and washed and dried as before. It was a white powder, weight 19.6 g., and had properties similar to those of the copolymers of Examples 1 and 2 except that its beginning melting point was much lower, 133° C.

A run made in the same way but with no nitrogen blanket yielded 24.0 g. of a copolymer having a beginning melting pointing of 142° C.

Titration of these two products after hydrolysis as described in Example 1 showed that their structure was made up of repeating units containing 0.952 and 0.88 molecule of bicyclo[2.2.1]hepta-2,5-diene respectively per molecule of maleic anhydride.

I claim:

1. A process for making a thermoplastic copolymer of maleic anhydride and bicyclo[2.2.1]hepta-2,5-diene which comprises contacting maleic anhydride and bicyclo[2.2.1]hepta-2,5-diene in the presence of an effective amount of a free radical initiating catalyst.

2. The process of claim 1 wherein the copolymerization is carried out in solution in an inert organic solvent at about 70–150° C.

3. The thermoplastic copolymer of maleic anhydride and bicyclo[2.2.1]hepta-2,5-diene produced by the process of claim 1.

References Cited by the Examiner

UNITED STATES PATENTS

| 2,876,894 | 3/1959 | Dahlquist et al. | 260—78.5 |
| 2,886,608 | 5/1959 | Drysdale | 260—666 |
| 2,971,939 | 2/1961 | Baer | 260—78.5 |

OTHER REFERENCES

Ullman: "Chemistry and Industry," London, September 1958 (pages 1173–1174).

JOSEPH L. SCHOFER, *Primary Examiner.*

WILLIAM H. SHORT, LEON J. BERCOVITZ,
*Examiners.*